United States Patent
Hanks et al.

(10) Patent No.: US 7,480,241 B2
(45) Date of Patent: Jan. 20, 2009

(54) METHOD FOR PROCESSOR OVERLOAD CONTROL IN A VOICE OVER INTERNET PROTOCOL CABLE MODEM TERMINATION SYSTEM

(75) Inventors: William T. Hanks, Carol Stream, IL (US); Tom Cloonan, Lisle, IL (US); Brian Barker, Naperville, IL (US)

(73) Assignee: Arris International, Inc., Suwanee, GA (US)

(*) Notice: Subject to any disclaimer, the term of this patent is extended or adjusted under 35 U.S.C. 154(b) by 735 days.

(21) Appl. No.: 10/933,065

(22) Filed: Sep. 2, 2004

(65) Prior Publication Data

US 2005/0052993 A1    Mar. 10, 2005

Related U.S. Application Data

(60) Provisional application No. 60/499,501, filed on Sep. 2, 2003.

(51) Int. Cl.
*H04L 12/26* (2006.01)

(52) U.S. Cl. .................................. 370/231; 370/395.41

(58) Field of Classification Search ......... 370/229–231, 370/235, 236, 400–401, 352, 356
See application file for complete search history.

(56) References Cited

U.S. PATENT DOCUMENTS

| | | | | |
|---|---|---|---|---|
| 7,088,678 | B1 * | 8/2006 | Freed et al. | 370/230 |
| 2002/0085569 | A1 * | 7/2002 | Inoue | 370/401 |
| 2006/0171314 | A1 * | 8/2006 | Qian et al. | 370/230 |

* cited by examiner

*Primary Examiner*—Chi H. Pham
*Assistant Examiner*—Thai D. Hoang
(74) *Attorney, Agent, or Firm*—John L. Doughty

(57) ABSTRACT

CMTS software keeps track of the number of call requests accepted during a given monitoring period, this number being referred to as Count. As each call request is received, Count is compared to the current value stored in an overload state MIB (which can change multiple times during a monitoring period based on the actual overload state as reported by fault management). If Count exceeds the MIB value, the call request is denied. After the monitoring period ends, the Count of call requests accepted is reset to zero and the count value begins incrementing at the start of the next monitoring period as calls are accepted.

7 Claims, 2 Drawing Sheets

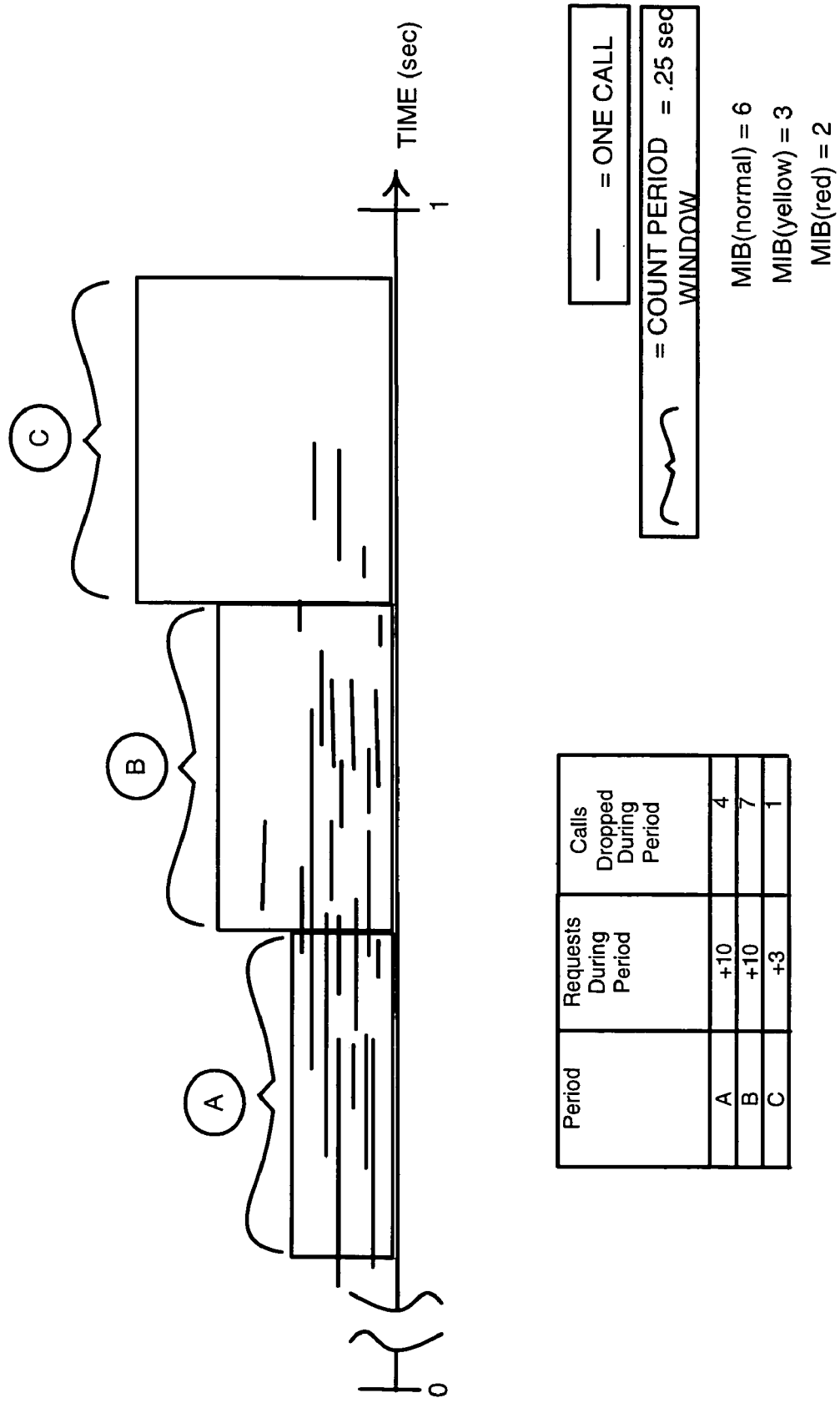

METHOD FOR PROCESSOR OVERLOAD CONTROL IN A VOICE OVER INTERNET PROTOCOL CABLE MODEM TERMINATION SYSTEM

CROSS REFERENCE TO RELATED APPLICATION

This application claims priority under 35 U.S.C. 119(e) to Hanks, et. al., U.S. provisional patent application No. 60/499,501 entitled "A method for call traffic overload control in a packetcable CMTS," which has a filing date of Sep. 2, 2003, and is incorporated herein by reference in its entirety.

FIELD OF THE INVENTION

The present invention relates generally to telecommunications, and more particularly to voice over internet protocol ("VoIP") traffic over a broadband network.

BACKGROUND

Community antenna television ("CATV") networks have been used for more then four decades to deliver television programming to a large number of subscribers. Increasingly, CATV networks are used by providers to provide data services to subscribers. For example, cable modems used in a broadband cable modem termination system ("CMTS") are capable of transmitting and receiving Internet data using the Data Over Cable Service Interface Specification ("DOCSIS") protocol. DOCSIS provides a standard that allows network devices made by different vendors to communication with one another.

Similar to DOCSIS, which is administered by Cable Television Laboratories, Inc. (CableLabs®), "PacketCable™is a CableLabs-led initiative aimed at developing interoperable interface specifications for delivering advanced, real-time multimedia services over two-way cable plant. Built on top of the industrys highly successful cable modem infrastructure, PacketCable networks will use Internet protocol (IP) technology to enable a wide range of multimedia services, such as IP telephony, multimedia conferencing, interactive gaming, and general multimedia applications."DOCSIS and PacketCable are protocol standards known in the art and do not require further discussion of their basic functioning. However, it will be appreciated that, although DOCSIS and PacketCable are currently considered industry standards, other protocol standards may become predominant over time. Thus, for purposes of discussion herein, DOCSIS may be generically referred to as a 'data protocol'and PacketCable as a 'multimedia protocol.'

In a broadband cable data network using a multimedia protocol, such as PacketCable, call traffic signals are typically processed by a CMTS. Thus, in addition to bandwidth capacity of the network, processing capabilities in the CMTS may impose a practical limit on the amount of traffic, either data or voice or multimedia, that can be processed by the CMTS. For example, processor resources in a CMTS typically are used to for call traffic signal processing, which may include—authorization, admission control and resource allocation. In addition to call signal processing, the processor may also be performing system function—traffic policing and shaping, ingress noise avoidance, fault management, and statistics collection. Therefore, there is a limit to the number of functions/processes that a processor can perform at a given instant. Moreover, since each call requires significant processor resources, there is a finite limit to the number of calls that a CMTS can process within a given amount of time. This can result in delayed dial tone, failed call setups and slow call teardowns.

When a voice call has been initiated, but the processor is overloaded, subsequent call signaling events may experience excessive latency. If a caller has already spent time dialing a number, waiting for a connection and has begun to converse with the other party, and then one of the aforementioned undesirable effects occurs, any subsequent call signaling events (codec upgrade, call waiting, call teardown, etc.) may experience excessive latency—perhaps to the point of not working at all. This can lead to frustration and wasted time.

To prevent this situation from occurring, the processor-load state has been categorized according to how lightly or heavily the processor is loaded. For example, if the processor is lightly loaded, the load state would be categorized as 'Normal.' When the processor is heavily loaded, it would be categorized as 'Red.' And, intermediate category would be 'Yellow.' When the CMTS processor is operating in a more loaded state, any new call request messages may be met with an increased likelihood of a denial of service. In other words, the call request is not granted, and the user would be presented with a signal indicating as much, such as, for example, a 'fast busy' signal that traditionally indicates that all circuits are busy. This would indicate that the caller should try calling back later. While this achieves the goal of preventing the user's call session from being started and then terminated, it can often lead to an inefficient use of resources, as the processor may be capable of handling more calls, even though it is in the Red category.

Furthermore, a call request may be presented to a CMTS in various formats. For example, when using PacketCable, as known in the art, messages are sent to the CMTS from a call management server ("CMS"), that observes when a caller's phone is placed 'off hook' and performs preliminary messaging between the callers customer premise equipment (telephone, cable modem, etc.) and the CMTS. The CMS may send a message to the CMTS informing it that a call is about to be placed, and that a gate (policy object) placeholder needs to be reserved. This placeholder request message contains minimal information necessary in order to reserve a 'place in line' for the call and to thereby generate a corresponding gate identifier to be used by the side of the call, but does not convey all of the information the CMTS needs in order to complete the call.

In contrast, the CMS may also send a gate results when the device being called has acknowledged that it will receive the call, and has responded with a message containing the signaling information needed to complete the call. In response, the device from which the call is placed generates and sends a complete signaling information message to the CMTS to which connects, and the call is completed when the CMTS loads this signaling information and connects the caller to the party being called.

Using PacketCable nomenclature, the call request which results in an identifier is referred to as a Gate-Alloc, which asks the CMTS to allocate a dynamic quality of service gate ("DqoS gate") to the originating subscriber. A message containing the complete signaling information is referred to as a Gate-Set message, which contains much more information related to the call than the Gate-Alloc message. Accordingly, more CMTS resources, i.e. processor resources, are used in processing a Gate-Set message than in processing a Gate-Alloc message.

Thus, when many Gate-Set messages have been or are being processed, the CMTS processor load is high and may enter the Red category. Presently, CMTS evaluate whether the processor is operating in the red category. Of so, other system functions as well as further call requests (Gate-Alloc messages) may be denied. However, this can waste CMTS processor resources, because the threshold at which the processor is deemed to be operating in the red is typically selected to occur before the processor actually has no remaining processor capacity to offer another call request. This results in call requests being denied, and therefore frustration to the callers as well as loss of revenue to the operator.

Therefore, there is a need in the art for a method that more efficiently uses CMTS resources so that more of a processors capacity is used in processing calls without causing a call to be dropped after it has been started.

SUMMARY

An aspect defines a plurality of programmable variables corresponding to a plurality of overload states, wherein a value stored in each of the programmable variables represents the number of additional VoIP calls the processor can accept during a monitoring period, depending on the current system overload state. A counter counts the number of call requests accepted by the CMTS during a monitoring period of a predetermined length of time. This is a moving window of fixed period. The number resulting from the count—the count number—is compared with the value in the programmable variable corresponding to the current overload state. If the count number exceeds the value in the programmable variable corresponding to the current overload state of the CMTS processor, a pending call request is denied.

BRIEF DESCRIPTION OF THE DRAWINGS

FIG. 2 illustrates a diagram showing calls being dropped as a result of processor overload state.

DETAILED DESCRIPTION

Figure 1:
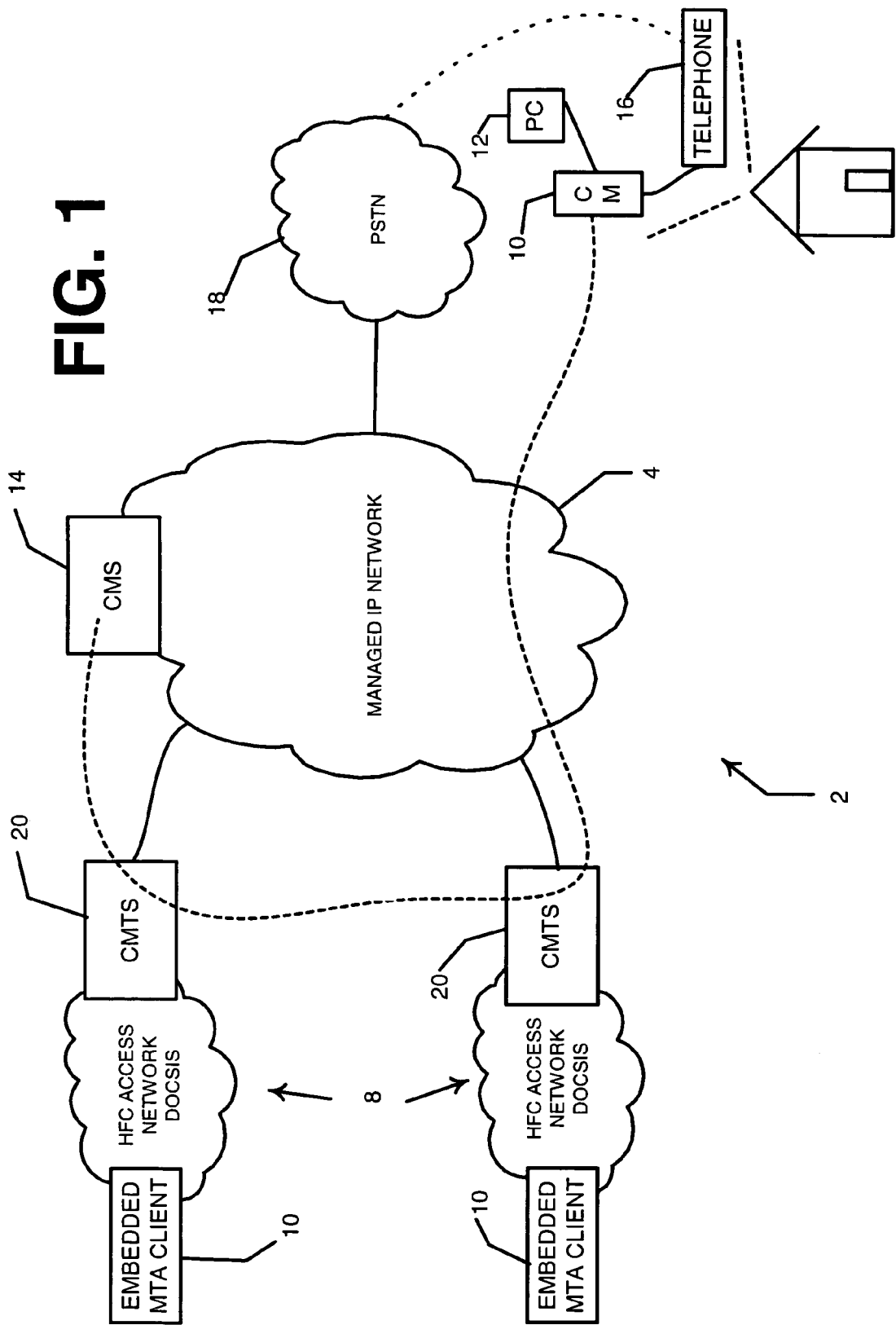
FIG. 1 illustrates a typical IP network used to carry VoIP calls between broadband networks and a PSTN.

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

"Turning now to the drawings, FIG. 1 illustrates a system 2 that uses an IP network 4 used to carry VoIP calls between broadband networks 8 and a PSTN 18. A user's cable modem 10, also represented by the embedded client symbols, connected to a personal computer 12, accesses the IP network 4 via hybrid fiber coaxial ("HFC") networks 8. Call management server applies call control and processing so that when a user placers a call using VoIP telephone 16, the call is processed and completed with another telephone, either a traditional telephone connected to the public switched telephone network 18, or another VoIP telephone, as if the call is completely over the PSTN. When a cable modem 10 is used to access an HFC network 8, the signals, whether data, voice or other multimedia traffic, are received at the CMTS 20 The processor(s) of a CMTS 20 handle many function including data routing of data packets and call set up related to VoIP calls. The more process that the CMTS processor(s) handle, the more burdened it/they become. The amount of activity the processor handles may be referred to as the processor load, and the processor may become overloaded if too many requests are made of it."

The CMTS software feature known in the art as fault management software tracks the overload state of the processor. This fault management software may produce an overload indicator that categories the overload state as being either normal, high or dangerously high, which states may be referred to as Normal, Yellow and Red respectively.

Using these overload state categories, the CMTS software can manage call set up of VoIP call requests to reduce the probability that the processor reaches a state that causes it to 'crash'. By monitoring the number of call requests during a certain period, and comparing this number with a threshold value that corresponds to the current overload category, call requests can be refused if they would cause the processor to enter the next overload state. By selecting a monitoring period judiciously, dropped calls can be minimized while preventing the processor from being severely overloaded.

A management information base (MIB) stems from the OSI/ISO Network management model and is a type of database used to manage the devices in a communications network. It comprises a collection of objects in a (virtual) database used to manage entities (such as routers and switches) in a network. Objects in the MIB may be defined using a subset of Abstract Syntax Notation One (ASN. 1) called "Structure of Management Information Version 2 (SMIv2)"RFC 2578.The software that performs the parsing is a MIB compiler. The database may be hierarchical (tree-structured) with entries addressed through object identifiers. Internet documentation RFCs discuss MIBs, notably RFC 1155, "Structure and Identification of Management Information for TCP/IP based internets", and its two companions, RFC 1213, "Management Information Base for Network Management of TCP/IP-based internets", and RFC 1157, "A Simple Network Management Protocal".

Turning now to FIG. 2, a diagram is shown that illustrates calls dropped during a period of predetermined time to prevent processor overload of a CMTS processor. Three discrete time periods are shown, A, B and C. In the figure, the height of the box, where one box represents one of the periods of predetermined time, indicates the overload state of the processor. The overload state during Period A is Normal, during Period B is Yellow and during Period C is Red. Assuming that a configurable MIB has been established for each of the overload states, a value stored in a given MIB represents the number of call requests that can be accepted and set up during a given period when the processor overload state corresponds to that MIB. As shown in the example illustrated in the drawings, the Normal MIB is configured with a value of 6, the Yellow MIB is configured with a value of 3 and the Red MIB is configured with a value of 2. During A, ten call requests are received (a call is represented by a continuous horizontal line). Since the overload state during A is Normal, four calls are dropped because only six can be accepted during a period when the overload state is Normal. During B, the overload state is Yellow. Ten requests are also received during B, but since the overload state is higher than during A, seven calls are dropped because only three new calls can be set up during a given period of predetermined time. Finally, during C, only three call requests are received. However, one call is dropped because the overload state is Red and only two call requests can be accepted during a period when the overload state is Red.

The scenario illustrated and discussed in reference to FIG. 2 is an example for illustration purposes. The amount of time of a given period will preferably be less that 0.250 second. Furthermore, the example illustrated in FIG. 2 depicts a scenario where the overload state is constant during a given period. However, the fault management software typically updates the overload state more often that at the beginning of every monitoring period of a predetermined amount of time. Thus, if for example, the congestion state at the beginning of a period is Yellow and four call requests are received, one call will be dropped. If during that same period, and after the forth call request is dropped, the fault management software updates the overload state to Red, all additional call request during that same monitoring period will be dropped.

On the other hand, if the overload state at the beginning of a given monitoring period is red and four call request are received, the two later-arriving call requests will be dropped. However, if during this same monitoring period, the overload state is updated to Normal after these last-arriving call requests are dropped, four additional call request may be accepted during the remainder of the monitoring period, assuming that the overload state does not change again during the period. After the monitoring period ends, the Count of call requests accepted is reset to zero and the count value begins incrementing at the start of the next monitoring period as calls are accepted.

Thus, the CMTS software keeps track of the number of call requests accepted during a given monitoring period, this number being referred to as Count. As each call request is received, Count is compared to the current value stored in the overload state MIB (which can change multiple times during a monitoring period based on the actual overload state as reported by the fault management feature). If Count exceeds the MIB value, the call request is denied.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

We claim:

1. A method for controlling overload in a Cable Modem Termination System processor handling voice over internet protocol call traffic, comprising:
    defining a plurality of programmable variables corresponding to a plurality of overload states, wherein a value stored in each of the programmable variables represents a number of additional VoIP call requests the Cable Modem Termination System processor can accept;
    counting a number of call requests accepted by the Cable Modem Termination System processor during a monitoring period of predetermined time; comparing the count number with the value in the programmable variable corresponding to the current overload state as each call request is received; and
    denying a new call request when the current count number exceeds the value in the programmable variable corresponding to the current overload state.

2. The method of claim 1 wherein the programmable variables are Management Information Base variables.

3. The method of claim 1 wherein the monitoring period during which the accepted call requests are counted is a fraction of a second.

4. The method of claim 1 wherein a call request is a PacketCable GateSet message.

5. The method of claim 1 wherein the Cable Modem Termination System processor over load sate during a monitoring period is updated based on the current number call being processed during the monitoring period.

6. The method of claim 1 wherein the monitoring period begins after an immediately preceding monitoring period has ended.

7. The method of claim 1 wherein the monitoring period begins before an immediately preceding monitoring period has ended.

* * * * *